United States Patent [19]

Courts

[11] Patent Number: 4,807,120
[45] Date of Patent: Feb. 21, 1989

[54] TEMPORAL GARBAGE COLLECTOR WITH INDIRECTION CELLS

[75] Inventor: Howard R. Courts, Austin, Tex.

[73] Assignee: Texas Instruments Incorporated, Dallas, Tex.

[21] Appl. No.: 44,383

[22] Filed: Apr. 30, 1987

[51] Int. Cl.[4] .................... G06F 12/12; G06F 12/08
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,121,286 | 10/1978 | Venton et al. | 364/200 |
| 4,660,130 | 4/1987 | Bartley et al. | 364/200 |
| 4,695,949 | 9/1987 | Thatte et al. | 364/200 |
| 4,757,438 | 7/1988 | Thatte et al. | 364/200 |
| 4,758,944 | 7/1988 | Bartley et al. | 364/200 |

OTHER PUBLICATIONS

Lieberman and Hewitt, "A Real-Time Garbage Collector Based on the Lifetimes of Objects", 6/83, ACM vol. 26, No. 6, pp. 419–429.

Primary Examiner—Gary V. Harkcom
Assistant Examiner—Christopher H. Lynt
Attorney, Agent, or Firm—Thomas G. Devine; James T. Comfort; Melvin Sharp

[57] ABSTRACT

A garbage collection system for digital computers classifies memory objects into generations. Objects in older generations which need to reference younger generations must do so indirectly through indirection cells located in the older generation. Thus, all pointers into a generation come from younger generations or indirection cells. When a generation is collected, the indirection cells in that generation are defined to be oldspace and collected in the usual manner. Indirection cells of older generations which can point to the generation being collected are processed by a scavenger.

The system also includes read and write barriers which function to filter out undesirable pointers based on the classification and volatility of memory regions to which they point or are destined to be stored.

7 Claims, 3 Drawing Sheets

TEMPORAL GARBAGE COLLECTOR WITH INDIRECTION CELLS

BACKGROUND AND SUMMARY OF THE INVENTION

The present invention relates generally to digital computer systems, and more specifically to memory management of computer systems which utilize garbage collection.

Modern symbolic computing systems usually use a memory management technique called garbage collection. This technique involves allocating memory for objects from available free memory as they are requested, and returning memory to the pool of available memory when the objects can no longer be accessed.

The garbage collector is a process which runs independently of the applications which allocate memory and create garbage. A copying garbage collector is a process which, generally, scans through all of the currently accessible memory objects, and copies those which are accessible to a special location to be saved. Once this is done, all memory objects not so copied are garbage and can be reclaimed.

A copying garbage collector begins its collection operation by dividing the virtual memory space of the computer system into three logical spaces; oldspace, scavenge space, and newspace. Oldspace contains all of the objects which are to be collected. Scavenge space contains all of the pointers to oldspace objects, other than pointers within oldspace. Newspace contains objects which can be guaranteed not to point to objects in oldspace.

The garbage collector executes a processing sequence, often called a scavenger, which proceeds through scavenge space from one end to the other. When pointers to objects in oldspace are encountered, the objects pointed to are copied from oldspace to scavenge space, at a position ahead of the scavenger. When an object is copied from oldspace to scavenge space a forwarding pointer is stored in the vacated position in oldspace so that if another pointer to the same object is processed, the scavenger can simply change the other pointer to the new object location. When the scavenger reaches the end of scavenge space, all oldspace objects which are accessible have been copied out of oldspace. At this point, all of oldspace may be reclaimed.

The garbage collectors on many present computer systems are known as stop and collect garbage collectors. This type of process, as the name implies, causes normal operation of the system to cease while the garbage collection process is run. This greatly simplifies the collection process because objects are not being modified and created while the garbage collector is operating. However, such a system has the drawback that no useful processing can be done while the garbage collector is in operation. For large virtual address spaces, the time spent garbage collecting can be quite long. For example, systems having 10 to 60 megabytes can typically spend more than an hour for the garbage collection process.

Numerous incremental garbage collection systems have been implemented. These are primarily found on systems having hardware dedicated to symbolic processing. In general, the garbage collectors operate in a time-sharing arrangement with the normal system processes. This type of garbage collection is more difficult to implement, because care must be taken to insure that there is no unwanted interaction between the garbage collector and the normal system processes.

Since the length of time spent garbage collecting is proportional to the size of the address space being collected, some current garbage collection systems utilize the concept of generations of memory objects to collect less than the entire virtual memory space. This concept is based on the observation that a high proportion of newly created objects become garbage quickly, while old objects tend to stay. This can be envisioned simply by realizing that memory objects representing compiled system routines, such as compilers and window managers, rarely become garbage, while dynamic data structures of the currently operating program tend to become garbage relatively frequently. The idea behind generational garbage collection is to collect the young objects more frequently, thereby making more efficient use of the collector to make memory available.

A description of features desirable in a garbage collection system can be found in A Real-Time Garbage Collector Based on the Lifetimes of Objects, Lieberman and Hewitt, Communications of the ACM, volume 26, number 6, pp. 419-429, 1983. This paper describes one possible system using generations of objects to improve efficiency of garbage collection.

It is an object of the present invention to provide a garbage collection system which can simply and efficiently garbage collect a large virtual address space.

Therefore, according to the present invention, the virtual address space of a computer system is conceptually divided into a number of different generations. Most objects are classified by generations depending on their age within the system. Objects in older generations are not allowed to contain pointers directly to objects in younger generations. Instead, pointers are routed through indirection cells which are located in separate parts of the address space. Use of such indirection cells greatly simplifies the task of keeping track of pointers into oldspace and pointers between generations. When garbage collection is run on a given generation, all of the pointers into the space to be collected are contained in a relatively small number of indirection cells. It is necessary to scavenge only the spaces containing these indirection cells in order to accomplish the garbage collection process.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENT

The garbage collection system described below is suitable for use on any computer system capable of supporting the required operations. For example, LISP machine symbolic computers manufactured by Symbolics, Inc. and Texas Instruments Incorporated are suitable for implementation of the described system.

Figure 1:
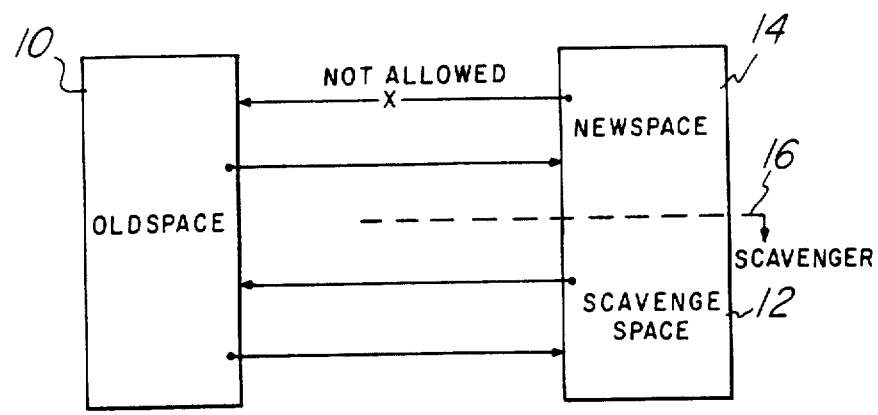
FIG. 1 is a block diagram illustrating the logical division of a virtual memory space.

FIG. 1 illustrates a logical division of the virtual address space of a computer system. Objects, which can be, for example, data structures, source code, or compiled programs, reside in oldspace 10, scavenge space 12 or newspace 14. FIG. 1 illustrates the condition of the virtual memory during a garbage collection process. Every object must be contained within one of these three spaces. Large objects, such as source code to a large program, are comprised of numerous smaller objects representing, for example, subroutines of the main program. The smaller objects may be located in different logical spaces, so that a large program may have routines located in both oldspace and newspace. However, at the lowest level objects are to be found only in one space or another. Oldspace 10 contains all those objects which are to be collected. Scavenge space 12 contains all objects which may have pointers into oldspace 10. As will be described below, many of these objects will be nothing more than forwarding pointers to objects in oldspace 10. A scavenger routine, located at 16, moves through scavenge space a word at a time, converting it into newspace as will be described. Newspace 14 contains objects which can be guaranteed not to contain pointers into oldspace 10.

Pointers are not allowed from objects in newspace 14 to objects in oldspace 10. Scavenge space 12 is the only space which is allowed to contain pointers directly into oldspace 10. If an object in newspace 14 needs to reference an object in oldspace 10, it must do so indirectly by pointing to an object contained in scavenge space 12, which in turn points to the object in oldspace 10.

The scavenger sequentially processes words in scavenge space 12. When pointers to oldspace 10 are found, the referenced objects in oldspace 10 are copied to scavenge space 12 ahead of the scavenger, preferably at the end of scavenge space 12. The scavenger converts each processed scavenge space word into newspace 14. When the scavenger reaches the end of scavenge space 12, all of scavenge space 12 has been converted to newspace 14, and no pointers into oldspace 10 exist anywhere. At this time, oldspace 10 may be reclaimed.

Figure 2:
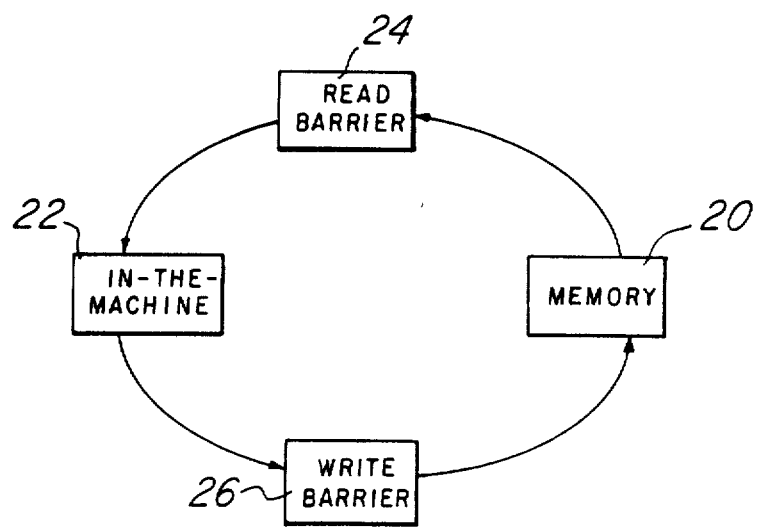
FIG. 2 is a block diagram illustrating the relationship between a central processor and memory of a computer system.

FIG. 2 illustrates system operation which prevents the creation of pointers from newspace to oldspace. FIG. 2 illustrates two locations where pointers may be found: memory 20, which includes oldspace, newspace and scavenge space, and "in-the-machine" 22, which is a logical abstraction of the central processor's hardware registers. Also shown are a read barrier 24 and a write barrier 26 which will be described below. Whenever data is read from memory 22, it must pass through the read barrier 24, and data written to memory must always pass through the write barrier 26.

The following rules apply to all activity within the system, specifically including user processes:

(1) Any data item located in memory 20 must be moved in-the-machine 22 before it can be used in any manner.

(2) Any write operation to memory 20 must store an item which is in-the-machine 22. That is, there is no direct memory to memory transfer.

(3) Any read operation will pass data through the read barrier 24. The read barrier 24 will not allow pointers to oldspace to be in-the-machine 22.

(4) Each address within the virtual memory space has an associated volatility, as will be described further in connection with FIG. 3. The write barrier 22 ensures that no pointers can be stored in memory 20 which violate the volatility rules described below.

Figure 3:
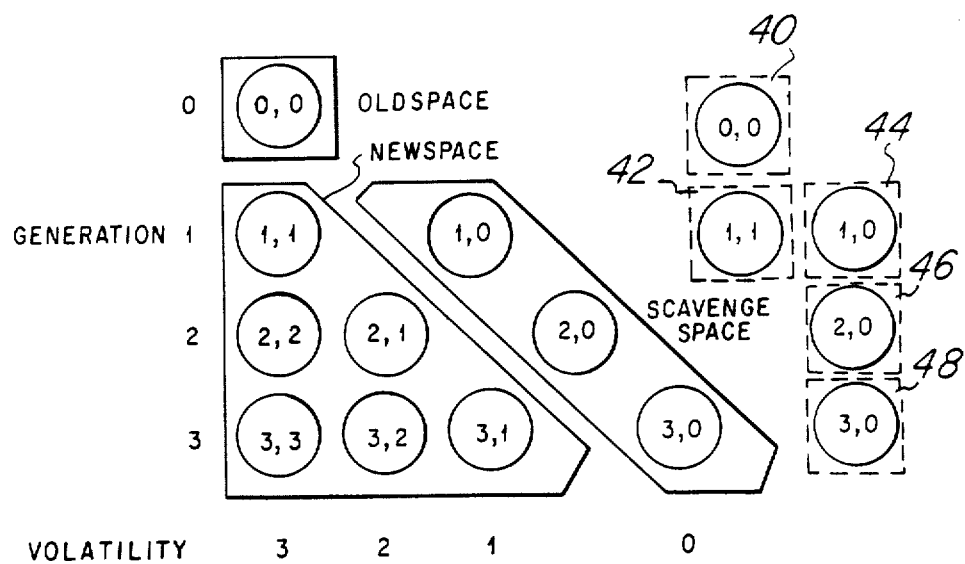
FIG. 3 is a diagram illustrating a logical division of a virtual memory space into buckets suitable for the implementation of indirection cells.

In order to efficiently implement the write barrier 26, the virtual address space is mapped into 10 "buckets" as shown in FIG. 3. Each bucket has two attributes, a generation and a volatility. The generation of a bucket is defined in the standard way: generations having lower numbers contain younger objects, while those having higher numbers contain older objects. Thus, generation 0 contains the youngest objects. Since the youngest objects tend to become garbage most quickly. Generation 0 is collected the most often. Generation 1 is collected less often, with Generations 2 and 3 being garbage collected much less frequently. As shown in FIG. 3, all buckets on each row have the same generation. Thus, for example, there are three buckets in Generation 2.

Each bucket also has an associated volatility. The volatility of a bucket indicates the youngest generation to which pointers in that generation may point. For example, the (3,0) bucket is in the third generation, and may contain pointers to all generations. The (3,2) bucket may contain pointers only to Generations 2 and 3. All buckets on a diagonal from upper left to lower right have the same volatility.

When garbage collection is begun for some specified generation, all of the buckets associated with that generation become oldspace. All of the buckets which can contain pointers pointing into that generation are easily identified, and these buckets become the scavenge space for that garbage collection process. For example, when Generation 0 is collected, only pointers from the (1,0), (2,0) and (3,0) buckets may point into the Generation 0 bucket. Thus, these three buckets become scavenge space, and the remaining buckets become newspace. This is the situation illustrated in FIG. 3.

The scavenger then moves through the scavenge space buckets defined above. As the scavenger moves through the scavenge space defined by these three buckets, the words processed are converted to newspace. As objects are copied from oldspace they are placed in a Generation 1 bucket marked as scavenge space. When the scavenging process is complete, the entire portion of memory in bucket (0,0) is returned to the system as available free space, since any accessible objects therein have been moved to Generation 1.

Only the buckets in the left-hand column of FIG. 3, those having a volatility equal to their generation, contain actual usable memory objects at the beginning of a garbage collection process. The other buckets contain only forward pointers. During the collection process, actual objects are copied from oldspace into scavenge space, but are eventually converted into newspace by the scavenger.

When objects are copied from oldspace to scavenge space, it will be apparent that forwarding pointers will remain within the new space just converted by the scavenger. These forwarding pointers may not be needed any longer since the objects that they originally pointed to have either been become garbage or have been promoted to Generation 1. This situation is resolved when Generation 1 is flipped and collected. At that time all forwarding pointers located in Generation 1 are examined and either recreated if still needed or eliminated if not.

The just described garbage collection process takes place while normal system activities are taking place. New objects which are created while the scavenging process is in operation are placed into a new generation 0 newspace bucket, which is a (0,0) bucket labelled 40. Objects converted by the scavenger are placed into a new (1,1) bucket 42. Also, any pointers from any object in Generation 1 to the new Generation 0 objects are forwarded through a newspace (1,0) bucket 44. Any pointers to the new objects from generations 2 and 3 arer directed through buckets 46 and 48.

As described above, every memory operation must go through the read barrier 24 or the write barrier 26. To avoid substantial degradation of system performance, both the read and write barriers must be extremely efficient, at least for the most common situation. For the write barrier 26, if there is no violation of the volatility rule, the write operation should proceed normally with minimal delay. For the read barrier 24, pointers being transferred to in-the-machine 22, other than those pointing to oldspace, should be transferred with minimal delay.

Figure 4:
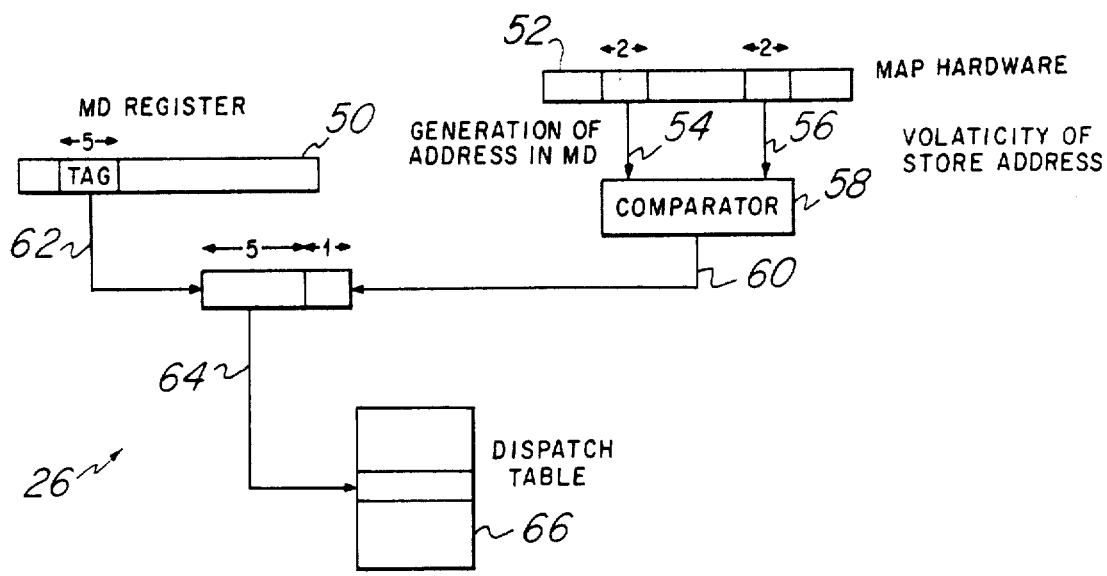
FIG. 4 is a block diagram illustrating operation of a write barrier.

A preferred mechanism for implementing the write barrier 26 is shown in FIG. 4. This implementation is suitable for use on an Explorer symbolic computer from Texas Instruments.

When a pointer is to be moved from in-the-machine 22 to memory 20, it is first placed into a special register, the MD register 50. Typically, at this point in the write cycle, the memory mapping hardware 52 is checked to see whether the virtual address to be written into is located in main memory. If not, a page fault routine is processed in a known manner. The next step, whether proceeded to directly or after returning from the page fault handler, is to check for a volatility violation. This is easily accomplished using the typical memory mapping hardware 52 found on symbolic computers.

The memory map hardware 52 contains 2 bits 56 which indicate the volatility of the memory location to be written into and 2 bits 54 which indicate the generation of the address contained in the MD register 50. These are compared by a comparator 58, and a single bit 60 generated. This single bit 60 has a value of 1 if the volatility value is less than or equal to the generation value. A 0 is generated otherwise. Thus, a 1 indicates that no volatility violation has occurred.

The bit 60 generated by the comparator 58 is combined with a 5 bit tag 62 from MD 50 to generate a 6 bit address 64 into a dispatch table 66. This table 66 is used by a dispatch instruction to determine the next step to process. If the addressed entry in the table 66 indicates control is to pass to the next instruction, there is no volatility violation and normal processing continues. This will be the case for all odd numbered addresses, since a 1 from the comparator 58 indicates no violation. Even numbered addresses may contain an instruction to branch to a routine to handle the volatility fault.

Use of the described dispatch table can be more efficient than some other implementations. The tag 62 indicates whether the value in the MD register 50 is a pointer or some other type of value. Only pointers need to be checked for volatility violations. Both of the addresses in the table 66 corresponding to non-pointer tags indicate control is to pass to the next instruction, so that no separate check is needed to see whether the value about to be stored is a pointer. In addition, it is sometimes desirable to branch to different fault handlers for different types of pointers, and this is easily done by putting the branch locations of the different handlers into the appropriate addresses of the table 66.

Figure 5:
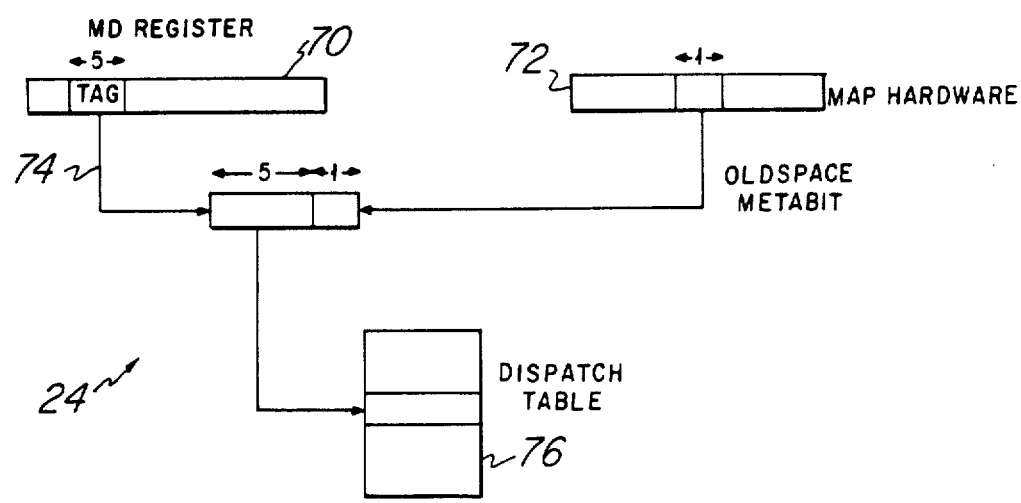
FIG. 5 is a block diagram illustrating operation of a read barrier.

FIG. 5 shows a read barrier 24 implementation which is also very efficient. It operates in a manner very similar to the write barrier 26.

When a value is to be moved from memory 20 to in-the-machine 22, it is first placed in the MD register 70. The memory mapping hardware 72 extracts a special bit, the oldspace-metabit, from the page table. This bit corresponds to the address pointed to by the value in MD 70, and indicates whether MD 70 contains a pointer into oldspace. That is, the value of any pointer in MD 70 is compared to the page table, and a 0 is returned by the mapping hardware 72 if it is pointing into oldspace. A 1 is returned if the pointer is not pointing to oldspace.

As happens with the write barrier 26, the oldspace-metabit is combined with the tag 74 of the value in the MD register 70. This value is used to address a dispatch table 76. Addresses in the table 76 which correspond to no read violation indicate that control is to pass to the next instruction.

Both the read and write 24 and 26 are very efficient, needing only a single extra table lookup to accomplish their task if there is not a fault. Since this is done in hardware, the time delay is minimal. Of course, when a fault occurs, additional processing will be necessary. Example for the dispatch tables themselves, the same hardware can be used for both barriers.

In order to keep track of the generation and volatility for every virtual memory address, addresses are grouped into virtual memory pages. Any grouping could be used, but virtual memory is generally handled by paging anyway, so that little extra complexity is introduced. Each page has an associated volatility and old space metabit. These bits are stored in the page table, where they are available to the memory mapping hardware for use in the read and write barriers as described above.

Operation of the read and write barriers is somewhat similar for the case when a problem is detected. When such a problem is detected, ie.. a pointer to oldspace is being transferred to in-the-machine, which is an error detected by the read barrier, or a volatility violation is detected by the write barrier, a separate function must be run to correct the problem.

If an attempt is made to read a pointer which points to oldspace into in-the-machine 22, the read barrier 24 detects a violation. Such an occurrence is not uncommon, and can occur, for example, when a garbage collection process is begun and memory blocks which were previously in newspace are marked to now be in oldspace. All pointers to those blocks which did not previously violate the read barrier will now do so.

When a read violation is detected, a correction procedure moves the pointer which is attempting to be placed in-the-machine to the appropriate scavenge space address. The pointer which was being placed in-the-machine is also changed in memory to point to the new address in scavenge space, and is then placed in-the-machine, at which point normal processing resumes.

An analogous process occurs when a write violation is detected. How such a violation can occur can easily be illustrated with respect to FIG. 3. In this example, a pointer to the bucket (0,0) is to be written back into a object. This object resides in memory bucket (3,3). The volatility rules prevent a direct pointer from a (3,3) object to (0,0) object. Thus a volatility detection is detected.

The write barrier procedure then creates an indirection cell in bucket (3,0), which is allowed to point to bucket (0,0). The value of the pointer which was to be written to memory is placed into the newly created indirection cell. The address of the indirection cell is then placed into the memory object located in bucket (3,3), with a special tag indicating that this is a cell forwarding pointer. Whenever the pointer in this object is accessed, it is routed through the indirection cell in bucket (3,0), which is a pointer, so that the memory object in the (0,0) bucket is accessed in a manner transparent to the application program.

FIG. 3 illustrates the state of the virtual memory at the beginning of a generation 0 garbage collection. The operation of the collection process for other generations operates in a similar manner. When generation 1 is to be collected, a collection is first run on generation 0. At this point, all objects in oldspace have been moved to generation 1 newspace, and all pointers to accessible objects point to generation 1 or older. Collection then begins on generation 1.

When the generation 1 collection process begins, memory buckets (1,1) and (1,0) are marked as oldspace. All buckets which can contain pointers into oldspace must be marked as scavenge space, so that buckets (2,1), (3,1), (0,0), (2,0) and (3,0) ar marked as scavenge space. Collection is now run as before, with accessible (1,1) objects being copied into scavenge space and eventually being converted into generation 2 newspace. The actual memory objects collected during a generation 1 collection will then be located in bucket (2,2). Collection of generations 2 and 3 operates in an analogous manner.

In some systems, it may be desirable to give a special status to some types of memory objects and cause them to always be scavenged. An example of this is useful in connection with the Explorer symbolic computer from Texas Instruments. In the Explorer, separate stacks are kept for each process. The top portion of process stacks can be cached in the processor, but much of the various stacks is stored in the virtual address space. If stacks are promoted to higher generation newspace, a large number of indirection cells may be needed during later collections for objects on the stacks. The additional overhead for this has been found to be greater than simply scavenging the stacks during every collection. Thus, stack objects are specially marked so that the scavenger converts them to space which will be scavenged during all subsequent collections. For example, (1,0) stack objects are grouped together so that they will be placed in bucket (1,0) after a generation 0 collection. During a generation 1 collection, stack objects in bucket (1,0) are promoted to stack objects in bucket (2,0). Depending on implementation details of the system, other objects can be treated in a similar manner.

TECHNICAL ADVANTAGES

The use of indirection cells as described above allows a very efficient implementation of read and write barriers. These barriers enforce the rule against pointers into oldspace being allowed in newspace or in-the-machine.

The task of keeping track of pointers into oldspace is simplified, which in turn greatly simplifies the garbage collection process. All pointers into oldspace are contained in a small number of different areas corresponding to the appropriate buckets of memory, and it is necessary to scavenge only those buckets to be guaranteed that all accessible oldspace objects have been saved.

The generational feature of the garbage collector is well supported by the use of various buckets to hold the indirection cells. Creating an indirection cell when a write violation is detected means that it is not necessary to change the volatility of an entire object. Since volatility changes are generally made at the page level, it would be necessary to change an entire page of objects when one pointer was changed to point to an earlier generation. This means that when the earlier generation is collected, the entire page would have to be placed into scavenge space.

When indirection cells are used as described, the only objects initially in scavenge space are the indirection cells. During the collection process, the only other objects which appear in scavenge space are the accessible objects copied from oldspace. There is no extra inefficiency in marking a page as having a certain volatility when every object in that page has that volatility. Since the indirection cells, containing forwarding pointers, will be grouped together onto a few pages, the amount of paging necessary to follow these forwarding pointers will be minimized.

The present invention has been illustrated by the system described above, and it will become apparent to those skilled in the art that various modifications and alterations may be made thereto. Such variations fall within the spirit of the present invention, the scope of which is defined by the appended claims.

What is claimed is:

1. A memory management system for a digital computer, comprising:

a virtual memory conceptually divided into regions, wherein each region has an associated generation and volatility, wherein the volatility associated with a region indicates the youngest generation to which objects in that region may contain pointers, and wherein regions are classified as oldspace, newspace, or scavenge space:

a central processor having a set of registers:

a read barrier coupled to said central processor and to said virtual memory, wherein all data moved from said virtual memory to said central processor passes through said read barrier, and wherein said read barrier prevents pointers into regions classified as oldspace from being placed into said central processor; and a write barrier coupled to said central processor and to said virtual memory, wherein all data moved from said central processor to said virtual memory passes through said write barrier, and wherein said write barrier prevents pointers from being stored into addresses having an associated inconsistant with the generation of the address pointed to by the pointer.

2. The memory management system of claim 1, wherein said virtual memory is divided into four generations, and wherein each generation is divided into a number of regions such that each region for each generation has a different earliest generation to which it may contain pointers.

3. The memory management system of claim 1, wherein said write barrier, when an attempt to write a pointer is made which is not allowed by the volatility of the source region, creates an indirection cell in a region having the same generation as the source region and having an associated volatility which can contain a pointer into the destination region, wherein the value of the pointer from the source region is placed into the indirection cell, and a pointer to the indirection cell is placed into the address in the source region where the original pointer was to have been located.

4. The memory management system of claim 1, wherein, at the initiation of a garbage collection process for a given generation, all regions of that generation are designated as oldspace, all regions of older generations which are allowed by their associated volatility to contain pointers into the given generation are designated as scavenge space, and all other regions are designated as newspace.

5. A memory management system for a digital computer, comprising:

a memory conceptually divided into regions, wherein each region has an associated generation and volatility, wherein the volatility associated with a region indicates the youngest generation to which objects in that region may contain pointers, and wherein regions are classified as oldspace, newspace, or scavenge space:

a central processor; and a write barrier coupled to said central processor and to said memory, wherein all data moved from said central processor to said memory passes through said write barrier, and wherein said write barrier prevents pointers from being stored into addresses having an associated volatility inconsistent with the generation of the address pointed to by the pointer.

6. The memory management system of claim 5, further comprising:

a read barrier coupled to said central processor and to said memory, wherein all data moved from said memory to said central processor passes through said read barrier, and wherein said read barrier prevents pointers into regions classified as oldspace from being placed into said central processor.

7. The memory management system of claim 5, wherein said write barrier, when an attempt to write a pointer is made which is not allowed by the volatility of the source region, creates an indirection cell in a region having the same generation as the source region and having an associated volatility which can contain a pointer into the destination region, wherein the value of the pointer from the source region is placed into the indirection cell, and a pointer to the indirection cell is placed into the address in the source region where the original pointer was to have been located.

* * * * *